United States Patent
Thabuis

(10) Patent No.: US 10,890,889 B2
(45) Date of Patent: Jan. 12, 2021

(54) METHOD OF MONITORING AND ASSESSING THE OPERATION OF AN INDUSTRIAL INSTALLATION DRIVEN BY A PROGRAMMABLE CONTROLLER AND EQUIPMENT IMPLEMENTING SAID METHOD

(71) Applicant: TLOGIC AUTOMATION, Belfort (FR)

(72) Inventor: Frédéric Thabuis, Belfort (FR)

(73) Assignee: TLOGIC AUTOMATION, Belfort (FR)

( * ) Notice: Subject to any disclaimer, the term of this patent is extended or adjusted under 35 U.S.C. 154(b) by 444 days.

(21) Appl. No.: 15/742,621

(22) PCT Filed: Jun. 30, 2016

(86) PCT No.: PCT/EP2016/065336
§ 371 (c)(1),
(2) Date: Jan. 8, 2018

(87) PCT Pub. No.: WO2017/009057
PCT Pub. Date: Jan. 19, 2017

(65) Prior Publication Data
US 2018/0203428 A1    Jul. 19, 2018

(30) Foreign Application Priority Data

Jul. 13, 2015  (FR) ..................... 15 56654

(51) Int. Cl.
*G05B 19/05*    (2006.01)
(52) U.S. Cl.
CPC ......... *G05B 19/058* (2013.01); *G05B 19/056* (2013.01); *G05B 2219/24055* (2013.01); *G05B 2219/24067* (2013.01)

(58) Field of Classification Search
CPC ............... G05B 19/058; G05B 19/056; G05B 2219/24055; G05B 2219/24067
See application file for complete search history.

(56) References Cited

U.S. PATENT DOCUMENTS

| 5,740,440 A * | 4/1998 | West ................. G06F 8/24 |
| | | 714/E11.217 |
| 5,774,377 A | 6/1998 | Eidson et al. |

(Continued)

FOREIGN PATENT DOCUMENTS

| EP | 0 436 019 A1 | 7/1991 |
| EP | 2 434 357 A1 | 3/2012 |
| EP | 2 672 348 A1 | 12/2013 |

OTHER PUBLICATIONS

International Search Report Corresponding to PCT/EP2016/065336 dated Sep. 13, 2016.

(Continued)

*Primary Examiner* — Christopher E. Everett
(74) *Attorney, Agent, or Firm* — Davis & Bujold PLLC; Michael J. Bujold

(57) ABSTRACT

A method of monitoring and assessing program variables of an industrial installation driven by a controller (C) by instructions programmed in a user program. Specific monitoring modules (MS1 to MSt) are implanted, as close as possible in time to the variable(s) (V1 to Vt) to be monitored to monitor evolution in real-time. During execution, each specific monitoring module (MSy) reads, in real-time, the logic state of each of variables which it monitors in an instantaneous cycle turn (TCi) of the controller (C), compares this logic state with the previously recorded logic state, and, only in the case of a state change, records the new logic state read as well as the real-time time-stamp of this event in a global memory unit (UM_G). The recorded metadata is analyzed in order to check behavior of the installation, use (Continued)

this production data and identify a possible malfunction of program and/or the installation.

19 Claims, 3 Drawing Sheets

(56) References Cited

U.S. PATENT DOCUMENTS

| | | | | |
|---|---|---|---|---|
| 5,844,795 A * | 12/1998 | Johnston | ............. | G05B 19/058 |
| | | | | 700/83 |
| 5,870,693 A * | 2/1999 | Seng | ............. | G06F 11/22 |
| | | | | 702/122 |
| 2003/0014387 A1 | 1/2003 | Kreidler et al. | | |
| 2003/0101379 A1 * | 5/2003 | Bates | ............. | G06F 11/3664 |
| | | | | 714/38.1 |
| 2004/0205723 A1 * | 10/2004 | Juan | ............. | G06F 11/3466 |
| | | | | 717/124 |
| 2006/0155889 A1 * | 7/2006 | Furushima | ............. | G05B 19/05 |
| | | | | 710/8 |
| 2010/0100201 A1 * | 4/2010 | Chen | ............. | G05B 23/0272 |
| | | | | 700/67 |
| 2012/0240132 A1 * | 9/2012 | Kobayashi | ............. | G06F 9/4887 |
| | | | | 718/107 |
| 2013/0212420 A1 * | 8/2013 | Lawson | ............. | G06F 16/2471 |
| | | | | 713/400 |
| 2014/0018939 A1 * | 1/2014 | Ota | ............. | G06F 9/52 |
| | | | | 700/19 |
| 2014/0058538 A1 * | 2/2014 | Yaoita | ............. | G06F 11/323 |
| | | | | 700/28 |
| 2014/0088735 A1 * | 3/2014 | Hamasaki | ............. | G05B 19/04 |
| | | | | 700/40 |
| 2014/0212978 A1 * | 7/2014 | Sharpe, Jr. | ............. | G05B 23/0272 |
| | | | | 436/6 |

OTHER PUBLICATIONS

Written Opinion Corresponding to PCT/EP2016/065336 dated Sep. 13, 2016.
International Preliminary Examination Report Corresponding to PCT/EP2016/065336 dated Sep. 25, 2017.

* cited by examiner

METHOD OF MONITORING AND ASSESSING THE OPERATION OF AN INDUSTRIAL INSTALLATION DRIVEN BY A PROGRAMMABLE CONTROLLER AND EQUIPMENT IMPLEMENTING SAID METHOD

This application is a National Stage completion of PCTEP2016/065336 filed Jun. 30, 2016, which claims priority from French patent application serial no. 15/56654 filed Jul. 13, 2015.

FIELD OF THE INVENTION

This invention relates to a method of monitoring and assessing an industrial installation driven by a programmable controller by means of instructions programmed in a user program of said controller, said user program comprising internal variables for coordinating the execution of said instructions at every indefinitely repeated cycle turn of said controller, allowing the operation of at least a section of said industrial installation.

The invention also relates to an equipment for monitoring and assessing an industrial installation driven by a programmable controller that implements the method defined above.

BACKGROUND OF THE INVENTION

The industrial installations, which can be used in any kind of industries, are mainly driven by one or several programmable controllers commonly called Industrial Programmable Automata (API) or in English Programmable Logic Controller (PLC). Each controller operates by means of instructions programmed in a user program or program code, which is developed specifically for every driven industrial installation. So, the writing of a user program is complex and unique. Therefore, developing a user program is tedious, delicate and consequently costly. This is mainly due to the realization constraints of the user programs and to the operational difficulties of the programs and/or of the installations, which can be very frequent and difficultly identifiable, as well during the test phase as during the commissioning phase of the programmable controller on the production site.

In order to better understand the difficulties met and thus to seize the interest of the proposed invention, the fundamental principles and the main concepts of an automated industrial installation driven by one or several programmable controllers are recalled below.

An automated industrial installation mainly consists in a control part and an operative part. The control part is the control unit in charge of driving the physical components and the energies which ensure the operation of the operative part (production machines, assembly or mounting lines, etc.). The control part, which represents the core of the system, is generally driven by a programmed logic controller or programmable controller. It is the "conductor" of the system and will be called controller throughout the description. There are frequently automated industrial installations comprising several interconnected controllers, but the principle of the proposed invention is the same for each of them. Many types of equipment are connected to this controller and interact with the operation of the industrial installation, such as:
  sensors, measuring components, actuators, etc.
  control panels, bar code readers or the like, etc.
  robots, special machines, screwdrivers, etc.
  radio frequency tags (RFID), etc.
  remote computers, supervision stations, etc.
  and the like.

Using the manufacturer software available for every type of controller, the specially qualified user, commonly called automation engineer or programmer, designs and describes the configuration of all the equipment, networks, etc., which must be connected to the controller, as well as the function logic of the industrial installation, which will be written in the controller in the form of a user program. At the end of the development of this user program during the study phase, and after a theoretical "Offline" fine-tuning, the user program is transferred in the controller in "Online" mode. The "Offline" mode means that the programmer develops his program with the help of the manufacturer software, but without physical connection to the controller of the industrial installation, unlike the "Online" mode, in which the programmer sets up a physical connection to the controller through the manufacturer software, to fine-tune his program and the automated industrial installation, which is driven and operational when the controller is in "Run" mode.

The whole of the logic programmed and developed by the programmer, which accurately describes the behavior expected from the industrial installation to be controlled is contained in the "program code" or "user program". This user program present in the controller mainly includes the following elements:
  program tasks: set of subprograms and/or routines.
  subprograms and/or routines: zones of the program which contain equation lines.
  equation lines: in which the user regroups the elementary instructions of the industrial installation, to realize combinatory logic, a production cycle, operator messages, failure diagnostics, etc.
  elementary controller instructions.
  dedicated controller modules which perform system functions.
  specific modules created by the user for the concerned industrial installation known under the name "functional generic module", in English "addon".
  internal variables which represent the actions of the user program, which describe and set up the links and calls between the elementary instructions to perform the required functions.
  the hardware configuration
  and the like.

Besides the programming of the different operating modes of an industrial installation, the programmer must add and fine-tune equations intended to inform the user about the condition of these operating modes, the operations to be carried out, etc., but also to trigger diagnostic messages to inform and help the user in case of malfunctions or unintentional stoppages of the industrial installation. The creation of these programmed equations must allow obtaining an appropriate diagnosis of all components of the installation to report without ambiguity for example the presence of an electrical failure, of a mechanical failure, the presence of a safety stoppage, of a production stoppage, etc.

When the user program contains several program tasks, the controller allocates alternately resources to each of them, in order to process as quickly as possible all the instructions present in each of the programs and subprograms it includes, taking into account the parameterizing criteria assigned to the various tasks, their call, their type, their duration, their priority, etc. This mechanism, called program tasks workflow, is sometimes temporarily interrupted by the controller according to its resources or in order to respond to another processing task of the system with higher priority, or to the asynchronous requests of the manufacturer software of the connected "external systems", or, such as, for example, other controllers, remote computers, Man-Machine Interfaces, a programming console, etc. These requests from external systems are called asynchronous as they can occur at any time during the execution of the user program, unlike synchronous requests, which would then be processed at a specific location and time in the user program and which would therefore be less efficient than an asynchronous request for the mentioned need. These exchanges, which are complementary to the usual tasks of the controller, increase its workload and therefore affect its reactivity in answering the requests from these external systems. The activity and reaction time of the controller also depend on the time parameters an priorities defined in the configuration of the equipment and of the tasks. All this consequently contributes to making the response times of the controller to an external system neither instantaneous nor repetitive.

In the "Run" mode, the controller performs successively one after the other all the lines of the user program to apply the operation defined and written by the programmer in each of the tasks that control the driven industrial installation. Each complete work cycle of a task of the controller is called "cycle turn" TC. One cycle turn TC corresponds to one TC "cycle time", which represents the total time required by the controller to perform all of the instructions contained in a task of the user program while carrying out simultaneously all of its other own internal processing, in particular to respond to all external connected systems. In the continuation of the description, the reference "TC" designates either the cycle turn or the cycle time of the controller, according to the context. This cycle time varies according to the installations, generally from some milliseconds to some tens or hundreds of a millisecond. The TC cycle turns are chained and endlessly repeated by the controller, unless when it is set to "Off" mode by the user.

The internal variables which coordinate the operation and the execution of the user program instructions will from now on be called "variables". These variables are generally nominative as they are associated to an explicit name or symbol created by and for the user to further the legibility and the understanding of the user program. They are sometimes associated by the user with a physical address of the internal memory of every controller. The generic term "variable(s)" used in this invention independently includes these two forms of representation "symbol" and "address". These variables are the main elements processed by this invention. They are indeed very important in a controller as their state or evolution reflects at any time the behavior and operation of the industrial installation.

They are mainly classified in three distinct categories:
the Boolean variables, which represent two stable binary states of a variable equal to 0 or 1, also called "On/Off".
the numerical variables, integers or real numbers, characterized by positive or negative numbers, with or without decimals.
the complex variables of the character string type or the like which, to date, are not monitored by the existing monitoring systems, as it is not possible to visualize graphically the evolutions of this type of variables.

Regardless of the type of the variables, we will agree to use from now on in this document the generic term "logic state" to designate the value of a variable.

According to the requirements, it is possible to create either "global" variables that can be used everywhere in the user program or "local" variables that can be used only in one single program subset or in an "addon" module of the user program. In the continuation of the description, the term "variable" will regroup the set of all of these variables: Boolean, numerical, complex, for example of the character string type, belonging to an "addon" module, global and local, these different variable types are not limiting for the invention, and its adaptation to other specific data types can be considered.

The difficulties when writing and fine-tuning the user program of the controller, the "addon" modules of the user program and the whole of the mentioned elements frequently lead to unpredictable and unwanted behaviors of the controller and/or of the industrial installation, and/or to the generation of incorrect messages transmitted by the controller to the user, and/or to wrong data calculations, and/or to the loss of information between the various equipment connected, etc. To try to determine the cause of these troubles and to correct them, the manufacturer software has certain internal control and fine-tuning functionalities. However, all these internal functions are also subjected to the same numerous drawbacks and deficiencies as those met during the use of external analysis systems offered by some specialized suppliers, which try to meet this need by periodically interrogating the controller through a physical communication support to obtain the evolution of the variables. These solutions do not entirely meet the requirements and are insufficient to obtain a thorough understanding of certain blockages or to solve fugitive or complex problems, because of the many disadvantages mentioned hereafter. They require the physical connection of a programming console or of an external analysis system to each controller to be analyzed. This analysis method is sometimes complex and its implementation laborious, costly and sometimes does not provide significant results. The use of an external analysis system requires knowledge of this external analysis system and the development of a specific application in this external analysis system to work out this monitoring, and generally the addition of additional program variables in the controller. These additional variables are often necessary to produce an image of the variables that are not directly accessible for the external system, or to regroup the variables to be monitored in intermediate data tables in order to reduce the constraints linked with the multiple reading requests of the external system. The data exchanges between the external analysis system and the controller are subjected to the random response times between the two equipment. Variables therefore cannot be monitored in real-time because of the time lag between the moment of the occurrence of an event and the moment the external analysis system receives the information. As the controller cannot respond instantaneously to the external analysis system, some fugitive evolutions of variables can sometimes be undetectable. One can state as an example the case of a variable that evolves or whose state changes several times in a same cycle turn and that generally cannot be detected by an external analysis system.

The external analysis system requires the implementation of a communication with the controller, which can sometimes be laborious to set up because of version incompatibilities and of evolutions between equipment and software. The addition of permanent exchanges between the external analysis system and the controller increases the activity of the controller, creating sometimes new disturbances in its communication with the other equipment. The communication times obtained are closely linked to the speed performances of the controller and of the external system, generating different measurement results according to the architectures implemented for this monitoring. The external analysis system generates numerous periodic requests sent to the controller, including when the variables of the controller do not evolve, unnecessarily overloading the communication times. Moreover, the external analysis system does not consider the structure of the user program nor the interaction between the tasks contained in the controller, and therefore does not allow locating the exact origin of the writing of the variables causing the problems. It must remain connected permanently to the controller without having itself operating problems or power failures. When the controller is mounted on board of a mobile mechanism, setting up a wired connection between the controller and the external analysis system is sometimes physically impossible. When the external analysis system is used within the framework of a curative process and is installed after the detection of malfunctions, it does not allow analyzing the failures occurred prior to its installation or after its removal if the problem occurs again. The access to the whole of all controller variables is generally complicated or even impossible for some of them. For example, it does not provide access to the internal variables of the user "addon" modules to analyze and fine-tune their functioning. Likewise, it does not allow monitoring state changes of complex variables of the character string type for example. In a general way, the external analysis system does not allow direct reading, in real-time, of all variables of the installation.

Publication EP 0436 019 A1 proposes a monitoring system for very old controllers having distinct memory areas. This system is contained in a distinct RAM memory area and therefore separated from the user program, which is itself contained in a ROM memory area, and thus cannot carry out a real-time measurement of the signals, that is to say at the moment when they are executed by the user program. On the other hand, this system collects the signals to be measured in a common register and only records the trace of these signals in a single memory unit if there is a state change of the common register and not of the signals taken individually, which does not allow detecting several variable signal changes within a same cycle turn. Moreover, this system proposes no means of dating this record and only applies to variables of the Boolean type.

Publication EP 2 672 348 A1 classifies variables collected by a monitoring system integrated in a user program by assigning them a number, an index or a time. This system records at every polling of the monitoring modules all variables to be monitored, even if their state did not change, which creates a very high number of useless records, penalizing the capacity and speed of the controller as explained previously referring to the external analysis system, and makes records analysis more complex. Moreover, this system must be started and parameterized remotely by an external device and is therefore not autonomous or cannot be driven by user-programmable conditions. Furthermore, it proposes the monitoring of a very limited number of a dozen of variables, and it is limited to Boolean and numerical variables.

Publications US 2003/014387 A1 and U.S. Pat. No. 5,774,377 A propose remote monitoring systems of automatic systems in which the collected data is time-stamped and sent to a database via the Internet network.

Therefore, the various known monitoring systems do not allow an accurate analysis, nor a perfect and sufficient traceability of the operation of the controller. So there is to date no totally satisfactory solution.

SUMMARY OF THE INVENTION

The present invention aims to overcome these disadvantages by offering an ergonomic solution that allows tracking in real-time the evolution of all or a part of the variables in the very core of a user program and of the "addon" instance modules, regardless of the type of the variables, Boolean, numerical, complex (character string or the like), to render the behavior of the controller and of the industrial installation in a graphic, temporal form that can easily be interpreted by the user, penalizing as little as possible the resources of the controller. The graphic form implemented allows visualizing, regardless of the type of the variables, only all state changes of each of them, their exact values at every state change, as well as the time-stamp of these changes. The user this way has directly and very accurately the evolution of all or a part of the program variables present in the database of the controller, without resorting to other added variables or to dedicated data tables. The results obtained can be used immediately by the user with a dedicated and separated assessment device that allows carrying out calmly an analysis of the results either outside of the production context, allowing defining the necessary corrective actions under the best conditions, or directly during the production by connecting it to the controller to analyze the monitoring metadata immediately after their recording, which allows if necessary to accelerate the corrective actions. The proposed invention can be implemented for any type of controller, regardless of the manufacturer of said controller.

To this purpose, the invention relates to a monitoring and assessing method of the kind described in the preamble, characterized in that one implants at least one specific monitoring module at at least one location chosen in said user program or in one of the user "addon" modules, one assigns to said specific monitoring module at least one variable to be monitored, and in that, during the execution of the instructions in an instantaneous cycle turn of said controller, said at least one specific monitoring module, when it is activated and executed, reads in real-time by means of a reading unit the logic state of said at least one variable in said instantaneous cycle turn, compares by means of a control unit the logic state of said at least one variable of said instantaneous cycle turn with the logic state of this same variable recorded previously during the previous cycle turn, and only in case of a change of said logic state, it reads by means of a time-stamping unit the time data corresponding to the instantaneous cycle turn and records by means of a recording unit the new read logic state of said at least one variable associated to the time data of said instantaneous cycle turn, forming a metadata, in a global memory unit of said controller, and in that one analyses with a dedicated assessment device said metadata recorded in said global memory unit of the controller to visualize in real-time the operation of said user program and/or of said industrial installation and identify a possible malfunction in said user program and/or in said industrial installation.

The time data read by the time-stamping unit of said specific monitoring module can correspond to the real time of the internal clock of said controller, when said specific monitoring module is a module parameterized in "autonomous" mode or in "master" mode, or to the time read by another specific monitoring module, when said specific monitoring module is a module parameterized in "slave" mode and is associated to the other specific monitoring module parameterized in "master" mode.

One can advantageously assign to said specific monitoring module a number of variables to be monitored, and the reading unit of said specific monitoring module reads the logic state of each of said variables monitored in said instantaneous cycle turn and records in said global memory unit of said controller the logic state of all variables monitored in said instantaneous cycle turn if the logic state of at least one of said monitored variables has changed.

One implants preferably several monitoring modules at various locations chosen in said user program of the controller, in the routines or user "addon" modules concerned by the variables to be monitored and one assigns to every specific monitoring module one or generally several of these variables to be monitored. In the continuation of this document, the notion of user program will refer either to a program routine or to a user "addon" module.

One advantageously implants said specific monitoring module(s) as close as possible to the variable(s) to be monitored, that is to say after the writing of the variable(s) in said user program, and preferably immediately after their writing. The variable(s) to be monitored can be advantageously chosen in the group including the Boolean variables, the numerical variables, the complex variables of the character string type.

To analyze the metadata recorded in the global memory unit of said controller and identify a possible failure in said user program and/or in said industrial installation, one recovers in a dedicated assessment device said metadata recorded in the global memory unit of said controller. One can then either perform a deferred static offline analysis of said recovered metadata by means of a dedicated assessment software, or connect said dedicated assessment device to said controller to perform a dynamic online analysis of said latest recorded metadata. One can recover at any time said metadata in the dedicated assessment device.

According to the needs, one can parameterize with a parameterizing unit the operation of the specific monitoring module by means of at least one parameter chosen in the group of parameters including a "run" function for which said specific monitoring module is activated either manually by an external control or by the user, or automatically, depending on conditions, by said user program, a "stop" function for which said specific monitoring module is de-activated, an "initialization" function for which said specific monitoring module resets to zero its metadata corresponding to the variables monitored and recorded in said global memory unit of said controller, an "autonomous" mode or a "master" mode in which said specific monitoring module reads the real time of the internal clock of said controller, a "slave" mode in which said specific monitoring module uses the time read by another specific monitoring module parameterized in "master" mode.

One can also parameterize in said specific monitoring module the limit number of metadata that said recording unit can record in said global memory unit of said controller and, beyond this limit, said specific monitoring module can either interrupt the recording of the new metadata, or record the new metadata overwriting or re-overwriting the initially recorded metadata and re-starting the recording at location 0 of said global memory unit and re-starting recording from this location.

It is also possible to inhibit the monitoring of at least one of the variables monitored by said specific monitoring module. In this case, the logic state of the inhibited variable will only be recorded and displayable when the logic state of at least one of the other, non-inhibited variables of this specific monitoring module will change, thus allowing reducing in certain cases significantly the volume of the metadata and increasing the recording time.

In the preferred embodiment of the invention, for every different controller manufacturer, one designs a generic module dedicated to monitoring in said user program of said controller in the form of a unique program code, in the form of a user "addon" module, comprising at least said reading, control, time-stamping, recording and parameterizing units, and one implants each specific monitoring module in the form of an executable program module of said generic module dedicated to monitoring.

To this purpose, the invention also relates to a monitoring and assessing equipment of the kind described in the preamble, characterized in that it implements the monitoring and assessing method defined above.

BRIEF DESCRIPTION OF THE DRAWINGS

The present invention and its advantages will be better revealed in the following description of an embodiment given as a non-limiting example, in reference to the drawings in appendix, in which.

DETAILED DESCRIPTION OF THE PREFERRED EMBODIMENTS

The monitoring and assessing method of this invention consists in implanting, directly in the user program itself of a controller C that drives an industrial installation, one or several specific monitoring modules MS1 to MSt, where t designates the total number of modules implanted, arranged to monitor all or a part of the internal variables of said user program. When talking of one single specific monitoring module, it is designated by MSy, where y is comprised between 1 and t. V1 to Vt designate the total number of variables monitored by all implanted specific monitoring modules MSy, and V1 to Vn designate the maximum number of variables monitored by each implanted specific monitoring module MSy. The whole of the monitored variables V1 to Vt can be equally inputs/outputs of sensors, components, machines, etc., internal variables of the user program, variables of the industrial installation, communication variables, etc., Boolean, numerical, complex (character string) variables, etc. In the continuation of this description, the notion of "user program" will refer either to a program routine or to an "addon" module concerned by the variables V1 to Vt to be monitored.

The specific monitoring modules MS1 to MSt thus form "cookies" or "trackers" in the very heart of the user program. Their function is to memorize and take an inventory of all state changes of any variable V1 to Vt monitored by said specific concerned monitoring modules MS1 to MSt, associating the date and time Tj of every state change. As an example of the relevance of this monitoring, if one uses a specific monitoring module MSy implanted in the user program at every location where a variable V1 evolves, for example after every writing of said variable V1 in said user program, it is thus possible to detect all the evolutions of this variable V1 and in particular its possible multiple state changes that occur in one single cycle turn TCi of controller C, which no monitoring system can do at this time.

Figure 4:
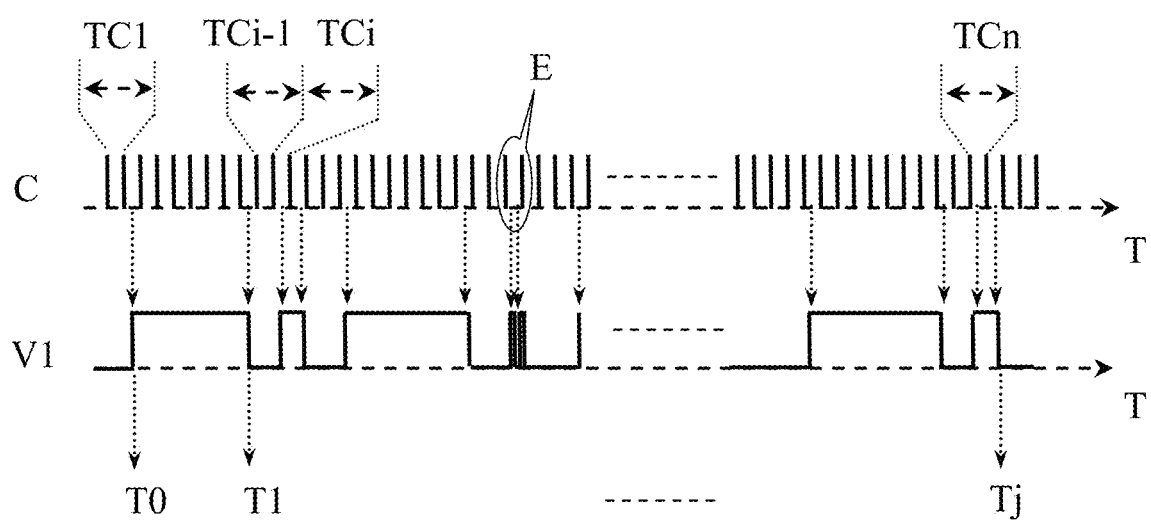
FIG. 4 is a diagram of the evolution over time of a variable V1 monitored with respect to the cycle time of the controller.

FIG. 4 allows illustrating this example. It represents the evolution in time of the state changes of a variable V1 monitored by a specific monitoring module MSy with respect to cycle time TC of controller C. It moreover indicates the possibility of detecting the possible multiple state changes of a same variable V1 in a same cycle turn TCi (see detail E). This type of problem can neither be detected nor be visualized with an external monitoring system. For information, the periodicity of cycle time TC of the controller is for example of the order of some milliseconds to some tens of milliseconds.

Then, the data collected during several cycle turns TC0 to TCi, where i is the instantaneous cycle time, by specific monitoring modules MS1 to MSt to detect a possible malfunction in said program are processed by means of a dedicated assessment software on a dedicated assessment device which allows carrying out a remote assessment or not. This dedicated assessment software allows in particular to represent the state changes and/or the evolutions of monitored variables V1 to Vt in a graphic form according to time, representative of the operation of controller C and of the industrial installation it drives, with the goal of detecting the cause of a fault, of a failure or of any other problem, performing various measurements of production, of cycle time, determining the interactions between variables, etc.

Figure 5:
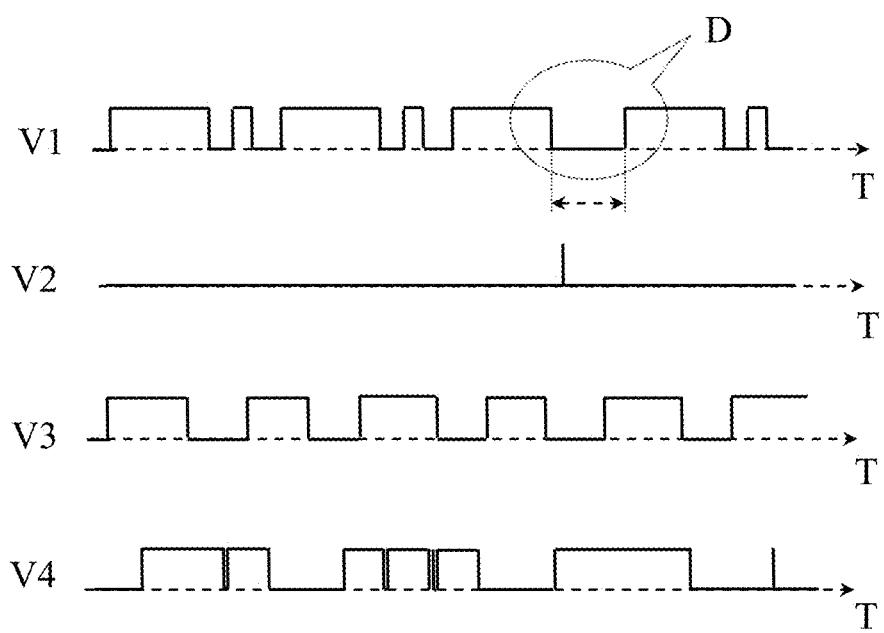
FIG. 5 is a diagram representing graphically the evolution of four monitored variables V1 to V4 to illustrate anomalies, malfunctions or the periodic cycle of a controller task.

FIG. 5 allows illustrating graphically the evolution of four variables V1, V2, V3 and V4, which show anomalies or malfunctions. The abnormal behavior of variable V1 identified by detail D can be for example correlated with the fugitive fault that occurred on variable V2 at the same moment. The periodicity of the state changes of variable V3, which could for example be the periodicity of a program task, is not regular and the evolution of variable V4 shows abnormal fugitive disappearances and appearances of the signal.

Consequently, the equipment allowing implementing the monitoring and assessing method according to the invention comprises at least specific monitoring modules MS to MSt, which are program modules installed by the programmer and/or the user in the user program of controller C, as explained below, as close as possible to variables V1 to Vt be monitored, that is to say after the writing of said variables in said user program and preferably immediately after their writing, and the dedicated assessment device provided with said dedicated assessment software, while this device can be a laptop computer or the like, remote from said controller C or not.

The specific monitoring modules MS1 to MSt are associated to a generic monitoring module MG, known under the name of "functional generic module", in English "addon", already mentioned previously, a module developed by the user in the user program of controller C from the software of the manufacturer of controller C. The generic monitoring module MG has the form of a unique program code that groups the functionalities required to perform the monitoring function of variables V1 to Vt according to the process of the invention. This unique program code cannot be run as such. But it can be called as often as necessary by executable program modules known under the name of "instances", forming said specific monitoring modules MS1 to MSt. The user can integrate, or instantiate, and thus create very quickly one or several specific monitoring modules which he identifies each by a name such as MS1 to MSt or MSy and which he implants at the very heart of the user program of controller C at places, zones or locations chosen by him, in particular as close as possible to each variable V1 to Vt he wants to monitor, that is to say after the writing of each variable in said user program and preferably immediately after their writing. He can, according to the needs, add or remove at his discretion and very easily one or several specific monitoring modules MS1 to MSt, even during the operation of controller C. He assigns to each of these specific monitoring modules MS1 to MSt a determined number from 1 to n of variables V1 to Vn to monitor. Consequently, the operating logic is identical for all specific monitoring modules MS1 to MSt, as it is dictated by the unique program code of generic monitoring module MG. But their behavior is independent since each specific monitoring module MSy uses its own input variables V1 to Vn and its own operating parameters determined by the user.

Each specific monitoring module MSy allows monitoring a limited number of variables V1 to Vn, this number n depends on the number of inputs available on the chosen generic monitoring module MG. Each variable V1 to Vn to be monitored is associated to one of the inputs of said chosen specific monitoring module MSy, allowing recording the logic state changes of said variable in the cycle turn corresponding to this or these possible logic state changes.

Consequently, as many specific monitoring modules MS1 to MSt as required can be implanted in the user program of controller C to increase the total number of variables Vt to be monitored, according to the needs. Therefore, the total number of specific monitoring module MSt implanted in the user program of controller C depends on the total number of variables Vt to be measured or monitored. To reduce as much as possible the impact of these specific monitoring modules MS1 to MSt on the dedicated memory unit UM of controller C and on its cycle time TC, generic monitoring modules MG with different sizes can be available according to the number and type of the input variables required by the user. As an example, one can mention a generic monitoring module MG for eight variables, a generic monitoring module MG for sixteen variables, etc., being well specified that these numbers are indicative and not limiting. To limit the execution time of specific monitoring modules MS1 to MSt and the subsequent consumption of cycle time of controller C, these specific monitoring modules MSy are really operated only when the variable(s) V1 to Vn monitored by concerned specific monitoring module MSy evolve, as explained later. Only as an example, for a controller C operating with a classical processor of the Rockwell® type, the average execution time of one single specific monitoring module with 16 variables V1 to V16 is about 100 microseconds; this value is merely indicative, as this time is directly linked to the type of controller C used.

Figure 1:
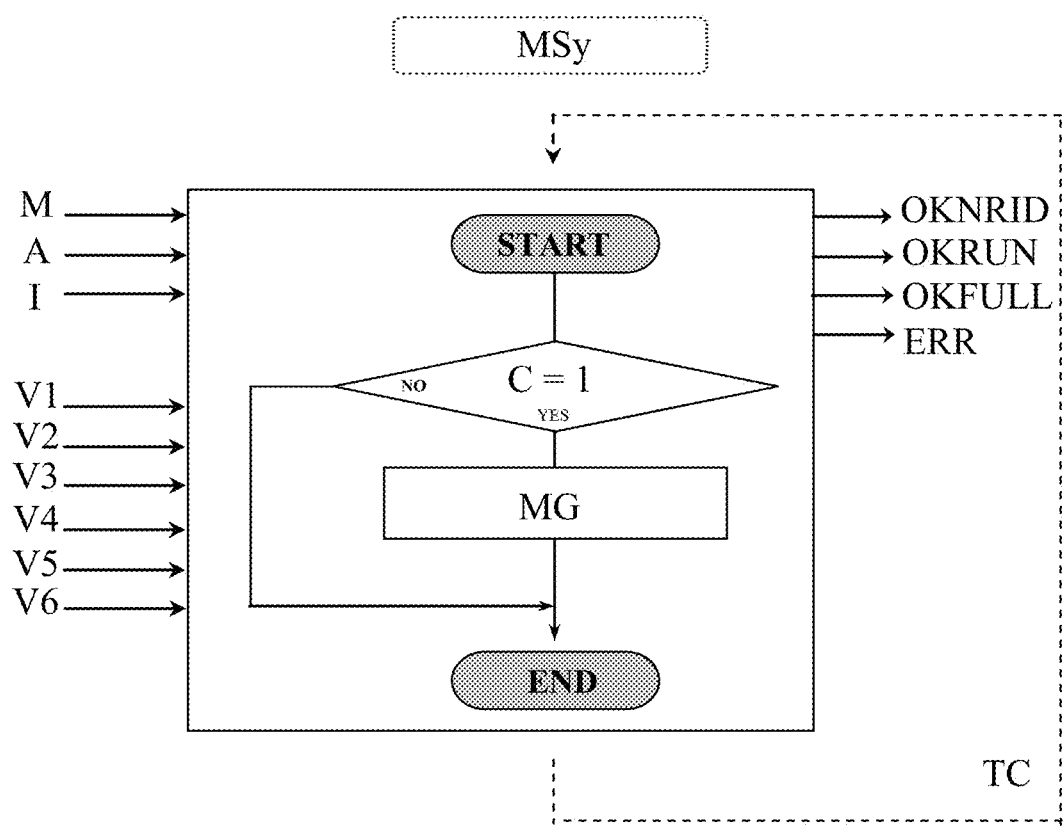
FIG. 1 represents the operating flowchart of a specific monitoring module MSy according to the invention implanted inside of a user program of a controller.

FIG. 1 represents in the form of a flow chart the way a specific monitoring module MSy, where y is any number between 1 and t, is executed during a cycle turn TC of controller C, during which the instructions programmed in said user program are executed in function of variables V1 to V16 to be monitored associated to said module MSy. According to the illustrated example, specific monitoring module MSy comprises three control inputs, that is to say an input M corresponding to the "run" function, an input A corresponding to the "stop" function and an input I corresponding to the "initialization" function, as well as six inputs for variables V1 to V6. These three control inputs allow the user to modify if necessary and at any time the operating mode of each specific monitoring module MSy. Input M allows activating the operation of specific monitoring module MSy, input A allows stopping the operation of specific monitoring module MSy and input I allows resetting the metadata of the specific monitoring module. The control inputs M, A and I of every specific monitoring module MS1 to MSt can be activated permanently by the user to be equal to 0 or to 1. They can also be activated by a program line written in the user program of controller C in function of a specific context. On can mention as examples: recording start in a specific time window, recording stop in case of detection of an anomaly, etc. There are also further parameterizing inputs, which will be described later.

In the illustrated example, specific monitoring module MSy also comprises state outputs to inform the user about the operating state of this MSy module, such as: authorization for use after the check of the required NRID identification number (OKNRID), parameterized in continuous or "wrap" recording mode (OKWRAP), running (OKRUN), memory declared saturated (OKFULL), error (ERR), errors detail, etc.

Referring to FIG. 1, if the NRID identification number for the authorization to use specific monitoring module MSy, checked by MSy, complies with the expected value, and if controller C is in "run" mode, that is to say that the respective outputs OKNRID and OKRUN are in a logic state equal to 1, then specific monitoring module MSy calls generic monitoring module MG to execute the functionalities necessary for monitoring variables V1 to V6 at every cycle turn TC of controller C, and this indefinitely every time this cycle turn TC repeats in said controller C.

Figure 2:
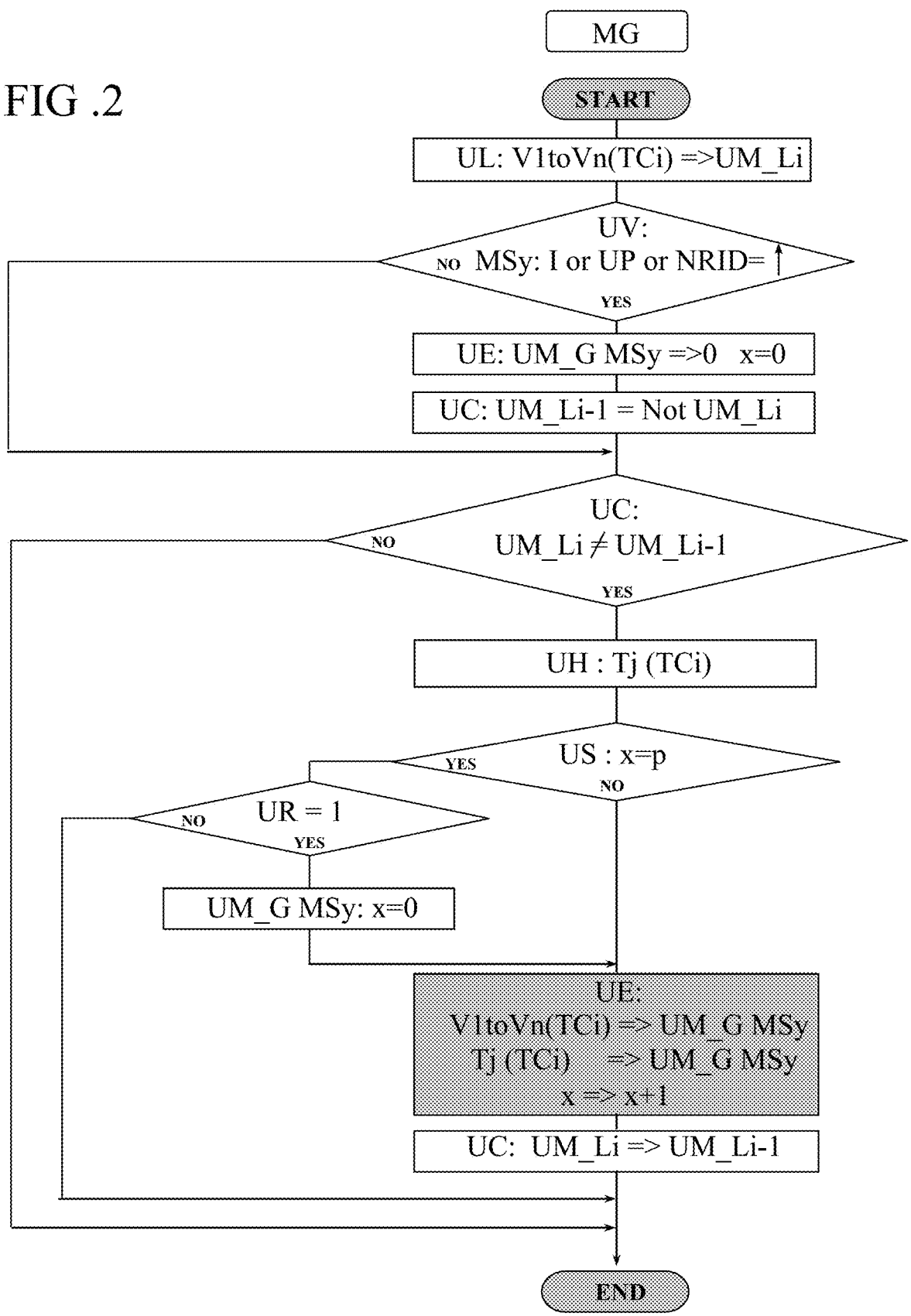
FIG. 2 represents the operating flowchart of the generic monitoring module called by the specific monitoring module of FIG. 1.

FIG. 2 illustrates in the form of a flow chart the functionalities of generic monitoring module MG, executed in an identical way every time said generic monitoring module MG is called by a specific monitoring module MSy in compliance with FIG. 1. These functionalities are expressed in the form of units arranged to carry out a function, but they correspond to executed program lines.

At every call of generic monitoring module MG by specific monitoring module MSy, a reading unit UL reads directly in real time the logic state of each of variables V to Vn of instantaneous cycle turn TCi of controller C to store them in an instantaneous local memory unit UM_Li of controller C (UL: V1 to Vn(TCi)=>UM_Li). Then, a control unit UC compares the logic state of these variables V1 to Vn of instantaneous cycle turn TCi stored in instantaneous local memory unit UM_Li with the logic state of these same variables V1 to Vn of previous cycle turn TCi−1 previously recorded in local memory unit UM_Li−1 of controller C (UC:UM_Li≠UM_Li−1). If there is no state change or no evolution of at least one of said variables V1 to Vn, that is to say when UM_Li=UM_Li−1, no recording in the metadata takes place and the execution of the unique program code of generic monitoring module MG remains waiting for a next call from another specific monitoring module MS1 to MSt. If there is a state change or an evolution of at least one of said variables V1 to Vn, a recording unit UE records and time-stamps the logic state of all variables V1 to Vn of instantaneous cycle turn TCi in a global memory unit UM_G of controller C corresponding to the specific monitoring module MSy, then it increments by one unit index x of the number of records (UE: V1 to Vn(TCi)+Tj(C)=>UM_G MSy then x=>x+1). In this case, control unit UC updates local memory unit UM_L by memorizing the new logic state of said variables V1 to Vn instead of the previous one (UM_Li=>UM_Li−1). The execution of the unique program code of generic monitoring module MG then remains waiting for a next call from another specific monitoring module MS1 to MSt. Generic monitoring module MG allows time-stamping simultaneously the state change of variables V1 to Vn monitored by said specific monitoring module MSy and only in case of state change. To that purpose, it comprises a time-stamping unit UH for instantaneous time data Tj where j designates the exact date and time that correspond to the instantaneous cycle turn TCi of controller C (UH:Tj(TCi)). To do so, the time-stamping unit UH reads either the real time of the internal clock of controller C when said specific monitoring module MSy is parameterized in "autonomous" mode or in "master" mode, or the time read by another specific monitoring module MS1 to MSt parameterized in "master" mode when said concerned specific monitoring module MSy is parameterized in "slave" mode and depends on a specific monitoring module MS1 to MSt parameterized in "master" mode associated to it by the user. These operating parameters are explained subsequently in the description. The instantaneous time data Tj read are associated to the new logic state of variables V1 to Vn of instantaneous cycle turn TCi and form together metadata (V1 to Vn(TCi)+Tj(TCi)). This metadata is recorded by recording unit UE in global memory unit UM_G of controller C and will then be analyzed and used in a deferred way or not, without loss of data accuracy, by the dedicated assessment device. They will allow real-time visualization of the user program and/or of the industrial installation, as well as a very accurate traceability of their operation and behavior.

The flow chart of FIG. 2 also shows a verification unit UV that checks control inputs M, A, I and the operating parameters chosen by the user for said specific monitoring module MSy, such as the presence of a "run" or "stop" or "initialization", etc., request. In "initialization" mode I of specific monitoring module MSy or during a NRID identification number change, or during a PANBREC parameterization change of the maximum number of records required in global memory UM_G of controller C (MSy:I or UP (UP=parameterizing unit, not represented on the drawings) or NRID=↑), the memories of the logic states of variables V1 to Vn, stored in local memory unit UM_Li−1 and corresponding to previous cycle turn TCi−1, will be initialized with the opposite value of the instantaneous logic states of variables V1 to Vn at instantaneous cycle turn TCi in order to trigger a state change and a first new recording of metadata (UC:UM_Li−1=Not UM_Li). Previously, recording unit UE resets global memory unit UM_G of controller C corresponding to specific monitoring module MSy (UE: UM_G MSy=>0 and x=0).

It must be noted too that an initialization request for a specific monitoring module MSy parameterized in Master mode automatically leads to an initialization request for all its specific monitoring modules MS1 to MSt parameterized in slave mode, associated so as to trigger an initialization of the metadata of the slave modules and that all of the metadata stored always remain synchronized with the time of the master module.

The flow chart of FIG. 2 also shows functions relating to the management of the records in global memory unit UM_G of controller C in function of the operating parameters of specific monitoring module MSy. A saturation unit US checks whether the maximum memory size allocated to the metadata in global memory unit UM_G, which depends on the number of records defined by the user, is reached or not. "x" is an index on the metadata records, incremented by global memory unit UM_G of controller C by 1 at every recording of a new metadata, for "x" varying from 0 to "p", p corresponding to a limit value. If limit "p" is not reached (US: x=p=>No), recording unit UE records the metadata in global memory unit UM_G of controller C, at the following index x+1, following the previously recorded metadata. When limit "p" is reached (US: x=p=>Yes), a rotation unit UR checks whether the metadata overwrite option, or "wrap" mode, has been selected by the user (UR=1). If this rotation option has been selected, global memory unit UM_G initializes index (UM_G MSy:x=0) so that recording unit UE records the new metadata of instantaneous cycle turn TCi over the metadata initially recorded at location 0 of global memory unit UM_G by overwriting, or re-overwriting during the following times, the old metadata present. If this option has not been selected, global memory unit UM_G is full, recording unit UE stops recording metadata and the execution of the unique program code of generic monitoring module MG waits for an initialization request, an increase of memory size or a validation of the "wrap" mode.

Since monitoring modules MS1 to MSt can be implanted by the programmer in any zone of the user program, and preferably as close as possible to the writing of variables V1 to Vt to be monitored, that is to say after the writing of each of said variables in said user program and preferably immediately after their writing, they perform constant monitoring of the evolution of variables V1 to Vt, in real-time, in a way fully transparent to the industrial installation and without affecting its operation, when the number of monitoring modules implanted is consistent with the performances of controller C and the cycle time constraints of the industrial installation. This way, the user has at any time the evolution of these monitored variables V1 to Vt at his disposal, to assess accurately the behavior of an element or of a function of the industrial installation according to their evolution. Moreover, this monitoring method can be implemented very quickly. In fact, the integration of generic monitoring module MG in the manufacturer software, as well as the integration of monitoring modules MS1 to MSt in the user program itself generally require only a few minutes. In the case of a high number of variables V1 to Vt to be monitored, the assessment software provides tools through a "LINE" function to generate automatically the program code of specific monitoring modules MSy in order to import them automatically in the user program of controller C in few clicks, to reduce substantially the programming time of said modules MSy and distribute variables V1 to Vt to be monitored on each module MSy according to a classification chosen by the user. The assessment software also offers to detect automatically all other variables linked to the state changes of each monitored variable Vn, in order to integrate in specific monitoring modules MSy all other useful depending variables involved in the analysis of a failure. These search and selection solutions of the variables to be monitored are novel and very efficient.

The assessment device moreover allows a more efficient analysis and assessment of the metadata than any other usual method, thanks to its search, selection or results sorting tools, further optimized by the fact that the metadata only contain the state changes of the variables and no other useless measure.

In addition to the recording of variables V1 to Vt, the implantation of specific monitoring modules MS1 to MSt in the various tasks of controller C provides a tool for assessing and measuring the operation of the workflow of the tasks of controller C. The measurement of dedicated variables V1 to Vt that evolve at each cycle turn in every task also allows the graphic visualization in the form of time slots of the real execution time of every task (see example V3 in FIG. 5). It is thus possible to better understand and to best adjust the characteristics of every task or, for example, understand and optimize the read and write frequency of the inputs/outputs with a third-party system in each of the tasks.

As already mentioned, the operating mode of every specific monitoring module MS1 to MSt can be parameterized by the user by means of a parameterizing unit UP (not represented in the drawings). The user can at any time and even during operation of controller C and of the industrial installation activate or de-activate the monitoring of variables V1 to Vn assigned to each module, or initialize the metadata of global memory unit UM_G of controller C corresponding to variables V1 to Vn of this module MSy, using control input I described previously. Using control inputs M and A allows holding up and resuming recording without loosing the records already performed, from any control device inside or outside controller C.

It is also possible to parameterize or adjust at any time the limit number of records "p" for every specific monitoring module MS1 to MSt, as mentioned above. This limit value is to be defined by the user according to the extent of the foreseeable evolution of the variables V1 to Vt he wants to monitor. When this limit value "p" is reached, the user can choose between:
  stop the recording of new metadata coming from monitored variables V1 to Vt and indicate that global memory unit UM_G of controller C is saturated (OK-FULL), or
  record the new metadata coming from monitored variables V1 to Vt by overwriting or re-overwriting the previously recorded metadata. This operating mode, which can be parameterized by the user, is called "turning" mode or "wrap" mode. It allows to never interrupt the recording of metadata and therefore to have always several minutes, hours, days, weeks, etc. . . . of saved evolution of variables V1 to Vt recorded in controller C by recording unit UE in global memory unit UM_G of controller C. This recording duration depends on the parameterizing of the required number of records and on the frequency of the state changes of variables V1 to Vn monitored by the corresponding specific monitoring module MSy. The larger the declared memory, the lower the number of state changes, the longer the recording time will be. However, infinite recording of the metadata is possible if the user periodically performs a backup of the program of controller C including the metadata.

It is furthermore easy to make evolve the present solution in order to perform these recordings automatically by means of the dedicated assessment software, for example when saturation unit US detects the saturation of the memory allocated by the user, so as to save the metadata in external data files. This is possible through a "REMOTE" function of the assessment software dedicated to controller C. The grouping of the metadata in a common global area, performed by specific monitoring modules MS1 to MSt, moreover offers the possibility to perform these backups in a significantly more efficient time than a classical external system, for which the variables are scattered in controller C and require multiple distinct reading requests.

Each specific monitoring module MSy has in addition a user-parameterizable option that allows him defining the recording mode of time data T0 to Tj of monitored variables V1 to Vn, that is to say:
  "autonomous" mode in which, at every state change of a variable V1 to Vn, time-stamping unit UH reads from the clock of controller C the internal time Tj corresponding to instantaneous cycle turn TCi, and recording unit UE records this instantaneous time Tj read associated to the state change of one or more variables V1 to Vn detected by control module UC, "master" mode in which, at every new cycle turn TCi, time-stamping unit UH reads the internal time Tj from the clock of controller C and recording unit UE records this instantaneous time Tj read and communicates it to its specific monitoring modules MS1 to MSt associated in "slave" mode, in order to use this reference time associating it to the state change of variables V1 to Vn detected by its control unit UC as in the "autonomous" mode, "slave" mode in which time-stamping unit UH uses the instantaneous time Tj transmitted by its specific monitoring module MSy parameterized in "master" mode that has been associated to it, and not directly the instantaneous internal time of the clock of controller C. Recording unit UE then records this time received from its master module to associate it to the state change of variables V1 to Vn detected by its control unit UC.

This "master" mode/"slave" mode notion is interesting if one wants to avoid time lags when displaying variables V1 to Vt that evolve in the same cycle turn TC and are monitored by several specific monitoring modules MS1 to MSt located at different locations in the user program of controller C. To illustrate this point, a state change of a same variable V1 monitored by two specific monitoring modules MS1 and MS2 implanted respectively at the beginning and at the end of the program allows obtaining two distinct time measurements. The time measurement performed by specific monitoring module MS2 is in this case equal to that performed by specific monitoring module MS1, to which the cycle time required by controller C to perform its activity between the execution of MS1 and that of MS2 must be added. However, this time accuracy is rarely necessary, as the important point is rather to control the sequence of the events in relation to each other. The different times measured for a same variable V1 to Vn monitored at different locations in the user program however demonstrate the possibilities of the measurement accuracy of the method and of the monitoring equipment of the invention. This accuracy is often very useful to measure exactly the cycle time TC of the controller for the execution of one single or of several tasks, routines, instructions, etc.

The exactness and accuracy of the time measurement of a state change of a variable V1 to Vn by means of a specific monitoring module MSy therefore depends on the location of said specific monitoring module in the user program with respect to the program line that controls said variable V1 to Vn. The closer specific monitoring module MSy is to the program line that controls this variable V1 to Vn, the more accurate the measurement of the time of the state change of this variable will be. This accuracy is voluntarily limited to 1 ms in order to reduce the size of the metadata in global memory unit UM_G, but the creation of a generic monitoring module MG with an accuracy of 1 microsecond can easily be considered if this is necessary. Example: measurement of the execution time of one single instance MSy.

Figure 3:
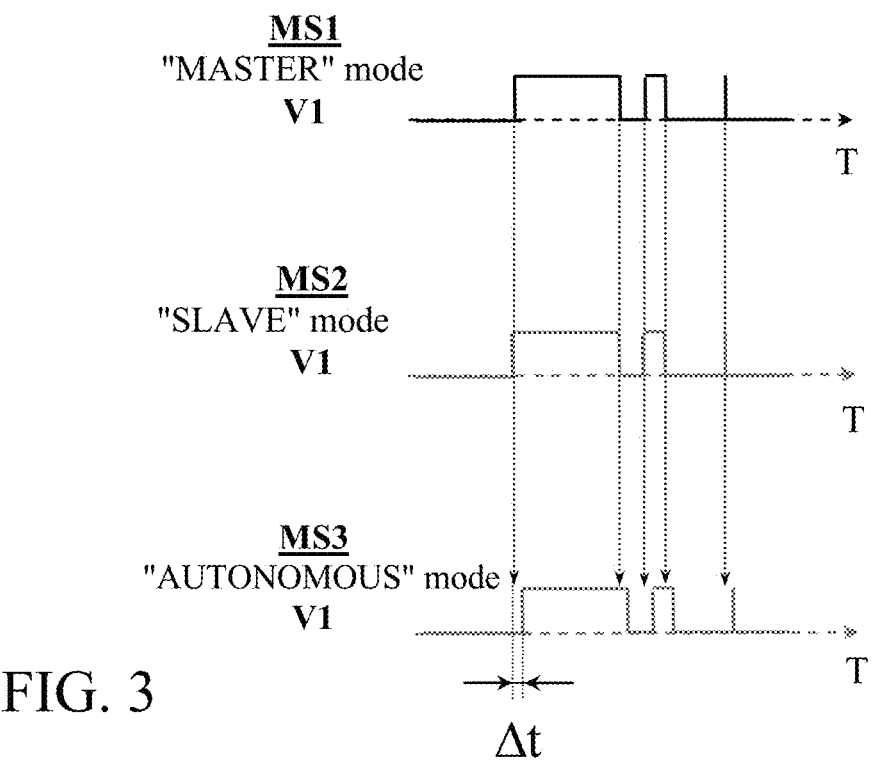
FIG. 3 is a diagram of the evolution over time of a same variable V1 monitored by three specific monitoring modules parameterized differently.

If this time difference mentioned previously represents a disadvantage for the assessment of certain results, as this generates metadata in very close times, the "master/slave" mode must be used to avoid this phenomenon. The interest of this "master/slave" mechanism is illustrated by the example of FIG. 3 in which a same variable V1 is monitored by three monitoring modules MS1, MS2 and MS3 parameterized respectively in "master", "slave" and "autonomous" mode. The association of a specific monitoring module MS2 parameterized in "slave" mode with a specific monitoring module MS1 parameterized in "master" mode allows obtaining an identical graphic representation for a same monitored variable V1 whatever the location of said modules in the user program, as the time-stamping read by specific monitoring module MS2 parameterized in "slave" mode is synchronized, in a same cycle turn TC, with that of specific monitoring module MS1 parameterized in "master" mode, thus allowing not to create several metadata in very close times for variables that evolve in a same cycle turn TC but, on the contrary, to store an absolutely identical time. One thus notes in the drawings of FIG. 3 that the graphic representation of this same variable V1 monitored by specific monitoring module MS3 parameterized in "autonomous" mode is slightly offset by a time interval Δt with respect to that of specific monitoring module MS1 parameterized in "master" mode. This time interval Δt corresponds to the duration of the processing of the user program of controller C between the execution of specific monitoring modules MS1 and MS3, which can reach several milliseconds, which is not the case between specific monitoring modules MS1 and MS2. To make this phenomenon disappear too, if necessary, when displaying the data during assessment, an additional data "compacting" tool offers, in the dedicated assessment software, to group the state changes of the variables according to a filtering time chosen by the user. By default, one will thus be able, for example, to group all metadata present in a parameterizable time interval, predefined at 10 milliseconds by default.

Among the other operating parameters selectable by the user for each of specific monitoring modules MS1 to MSt he wants to implant in the user program, one can quote as examples:

The "PAnotime" parameter, which allows inhibiting if necessary the recording of time data T0 to Tj in the metadata at every state change or at every evolution of monitored variables V1 to Vn. This option allows reducing considerably the size of the memory used in global memory unit UM_G of controller C in the case the user wants to visualize only the evolution of the variables without having necessarily the time-stamp.

The "PAinhib" parameter allows inhibiting the monitoring of one or several monitored variables V1 to Vn. This option also allows optimizing the memory used in global memory unit UM_G of controller C and the execution time of the concerned specific monitoring module MS1 to MSt by de-activating the monitoring of certain variables V1 to Vn. The state or the evolution of these inhibited variables will then only be memorized in the metadata when the state of another, not inhibited variable V1 to Vn will change or evolve.

To extract the metadata thus created by specific monitoring modules MS1 to MSn and recorded in global memory unit UM_G of controller C, the user connects physically a programming console suitable for this type of controller C and activates a backup function in the manufacturer software, which backs up simultaneously the logic states of all variables present in controller C at this moment. This function will allow saving all of the user program, including a complete reading of all metadata recorded in global memory unit UM_G of controller C from index 0 to index "p". This metadata is then exported in a file, in a standard format such as for example the XML format, to be processed by a dedicated assessment software developed jointly with specific monitoring modules MS1 to MSt and located in a dedicated assessment device. The backup function can be performed according to the needs defined by the user or following for example a failure of the installation. When backup is complete, the user can disconnect his programming console to assess and interpret in a deferred way the metadada backed up and read by means of the dedicated assessment device, thanks to the tools provided in the assessment software dedicated to the specific monitoring modules MS1 to MSt.

The dedicated assessment software allows exploiting all recorded metadata in order to visualize precisely the evolutions of all monitored variables V1 to Vt of controller C and of the industrial installation driven by it. This dedicated assessment software is unique and common for all user programs of several controllers C to be assessed. It provides a user-friendly graphic interface, suitable for visualizing the metadata records, locate very quickly a malfunction or perform a time measurement between the events. It provides the user with efficient metadata processing tools which allow him performing troubleshooting, measurements, traceability and monitoring of controller C and of the industrial installation driven by this controller. It furthermore allows grouping and crossing the metadata collected from various controllers C. It is thus possible to fetch as many variables V1 to Vt in each controller C in order to merge them in a data file that will allow visualizing very quickly all of the metadata, what no monitoring equipment known so far allows realizing as easily and rapidly with such accuracy. To do so, it is preferable that the time-stamping of concerned controllers C is identical or as close as possible for measurement exactness. This grouping is moreover very efficient to obtain for example a diagram of the exchanges between these controllers C when they communicate with each other or share a common process.

The dedicated assessment software automatically detects the presence of all specific monitoring modules MS1 to MSt present in a user program of controller C to monitor all associated binary, numerical and complex variables V1 to Vt. It thus offers the user the list of all these specific monitoring modules MS1 to MSt to be visualized. After having selected the desired specific monitoring module MSy, the evolutions of the corresponding metadata recorded by said module are then instantaneously displayed on the display of the dedicated assessment device for assessment, including during the change of the module to be displayed. It also allows sorting the variables for a same specific monitoring module MSy as well as between the modules of one or several controllers C by means of customized lists. This function, called "MERGE", allows saving, retrieving, reusing all types of operating, breakdown, etc., scenarios, including the time measurements and indicators positioned on the display during diagram analysis.

The dedicated assessment software also comprises a graphic functionality that allows the user to choose between two display modes and to switch instantaneously between these two modes, which both have advantages and disadvantages.

The user can select a display mode without linear time base. The main advantage of this display mode is to visualize only the state changes of all variables V1 to Vn that correspond to said specific monitoring module MSy analyzed, without considering the time between two events to define the display time base. This display mode thus allows visualizing on a same display evolutions of variables V1 to Vn that can have taken place within a large time span or very different time spans: several microseconds, milliseconds, seconds, minutes, hours, days, etc., to visualize and understand the chain of events. In addition, a zoom function allows concentrating even more the number of events visible on the display. However, this representation does not allow a visual comparison of the duration of the time slots visible on the display, as there is no time scale.

To remedy this, he therefore can also select a display mode with a parameterizable linear time base. The advantage of this display mode is that it allows visual comparison of the duration of the time slots visible on the screen. The main disadvantage of this display mode is that it allows visualizing only few events simultaneously on a same screen, leading to a lack of global legibility of the events. This instantaneous double display mode functionality is not known so far on other existing assessment devices of this type.

The monitoring and assessment equipment according to the invention can also be used for preventive troubleshooting applications. In this case, it is very interesting for the user to implant and standardize the use of certain specific monitoring modules MS1 to MSt in the user program of a controller C right from its design so as to monitor the main strategic variables V1 to Vt of the industrial installations that will be driven by said controller C, in order to have a preventive monitoring system without waiting for a problem to occur in said industrial installation prior to implanting this monitoring. This integration of specific monitoring modules MS1 to MSt as from the design of the user program thus allows not having to add at a later point an external measuring system and not taking the risk of disturbing subsequently the operation of an industrial installation already in operation, as they have always been integral part of the program. In the case of a malfunction, the user can then collect and analyze the evolution of one or several variables V1 to Vt, search and locate the place in the user program that causes these failures to thus assess the abnormal behaviors of an industrial installation and determine the cause of a failure of this installation. He can record and keep operating or failure scenarios. He can filter the evolution of certain variables V1 to Vt over a period of time. He can visualize in the form of timing diagrams the behavior of the memorized variables V1 to Vt. He can thus create customizable and reusable lists of variables V1 to Vt for a given event. He can display variables V1 to Vt with a linear time scale, or with a dynamic time base that adapts automatically with the time of occurrence of every event, as explained previously. This solution allows restricting the number of visualizable measurements of the monitored variables V1 to Vt, displaying only the state changes of the variables. One can mention as an example: if a variable evolves 10 times over 24th, only the 10 successive state changes will be grouped on the display, to avoid having to scan the data over 24 hours.

The graphic tool of the assessment software offers, by means of a "TRACK" function, display functionalities for sorting variables V1 to Vt, filtering variables over a given time, defining the display order of the variables V1, V2 or V2, V1, the display color of the diagram of each variable, the immediate access to any state change, the suppression of unwanted interfering measurements, etc., the archiving of breakdown or production scenarios, the creation and re-use of variables lists between several specific monitoring modules MS1 to MSt, etc. As an example, one can mention: If MS1 monitors V1 to V15 and MS2 monitors V16 to V31, one can create a list that contains only V1, V25, V30 or V2, V4, V8, V9 and display one of these lists on the display.

The assessment software allows the time measurement of the events. The user can in particular determine accurately each evolution of any monitored variable V1 to Vt in real-time. He can generate a time signature of the operation of the industrial installation by memorizing a diagram over a given period to obtain an operation reference. He can measure all cycle times of a task, or of a subprogram, the operating time of an actuator or of an equipment of the operative part, the time between two events whatsoever, optimize the parameterizing and the number of tasks to be used, these examples being not limiting.

The assessment software also allows ensuring the traceability and monitoring of certain events. The user can in particular monitor and calculate events, the number of operator interventions, the number of failures and interventions, etc. He can realize a graphic follow-up of production or traceability data for the products of an installation. He can also perform efficiency or availability measurements of an industrial installation.

This assessment software has an additional operation option, which allows connecting the dedicated assessment device to controller C and work on line. This functionality is operational provided the dedicated software is installed on a computer that already contains a communication software compatible with controller C to be monitored. This functionality thus allows visualizing on a computer display the dynamic evolution of one or several variables V1 to Vt monitored in function of time, based on the recorded metadata. The solution offered with the remote assessment device according to the invention, as described above, eliminates the disadvantages mentioned previously referring to the known external analysis systems, except for the fact that a console must be connected, and significantly reduces the number of variables read requests sent to controller C. In fact, in this case, the assessment software reads periodically the metadata recorded previously by specific monitoring modules MS1 to MSt in controller C, but only for the few variables V1 to Vt present on the display, and which the user wants to visualize, that is to say for example a maximum of sixteen variables simultaneously, this number not being limitative. The assessment software moreover has an adjustment for this reading periodicity of variables V1 to Vt, in order to almost eliminate the risks of disturbances of controller C, as is the case with a known external system, and to never disturb the exactness of the real-time measurements, which are always carried out by specific monitoring modules MS1 to MSt present in the user program of said controller C. A higher time period of this scanning period of the assessment software simply translates in a slowing down of the refresh of the variables visualized on the display by the user. But, whatever the setting of this variables reading time, it does not affect the pertinence nor the exactness of the results obtained, as all of the variables V1 to Vt monitored go on uninterruptedly being memorized in real-time in internal global memory unit UM_G of controller C by means of the specific monitoring modules MS1 to MSt and the assessment software only queries the metadata already recorded during the previous cycle turns TC, up to the just previous cycle turn TCi−1.

This assessment software moreover comprises, through a "CHECK" function, other very ergonomic and efficient additional tools intended for technical support of the programmer to facilitate and optimize as much as possible the fine-tuning of automated installations such as for example:

the analysis and control of the user programs, which is useful for example within the framework of the invention, to check the consistency of the parameterizing of modules MSy, the presence of errors of use or forgotten parameterizing, calculate the number of monitored variable, evaluate the required cycle time, etc.

the reading or writing of the logic states of variables in controller C by means of a data file of the Excel type, to perform periodically and automatically backups and restore the metadata, of a production context, etc.

Possibilities for Industrial Application:

This description shows clearly that the invention allows reaching the goals defined, that is to say an efficient monitoring and assessment method implemented by means of simple equipment, very quick to integrate and parameterize, the analysis of its results not being only reserved for the automation experts of controller C, but accessible to the other users of the installation, almost without affecting the operation of controller C and allowing with a simple data survey to assess the behavior over time of controller C and at the same time the behavior over time of the industrial installation it drives, and detecting sporadic failures and malfunctions of said industrial installation in order to suggest suitable corrective measures as well in the user program of controller C as in the industrial installation. The implementation rapidity and simplicity, and the pertinence, the accuracy of the results obtained and the ease of assessment demonstrate the interest of the invention for the monitoring of the programmable logic controllers and of the industrial installations they drive.

Moreover, this monitoring and assessment method implemented by said equipment of the invention allows performing additional analyses and/or assessments such as:

The cycle diagram of the industrial installation, called "machine signature",

The detailed measurement over time of the operation any element driven by the automatic control, The measurement of the cycle time of controller C.

The calculation of the efficiency and availability of the industrial installation (standstill time calculation, etc.), The production condition of the industrial installation (for example number of faulty parts), Etc.

The present invention is not restricted to the example of embodiment described, but extends to any modification and variant which is obvious to a person skilled in the art.

The invention claimed is:

1. A method of monitoring and assessing an industrial installation driven by a programmable controller (C) by instructions programmed in a user program of the controller (C), the user program comprising internal variables for coordinating automatic execution of the instructions at every indefinitely repeated cycle turn (TCi) of the controller (C), allowing operation of at least a section of the industrial installation, the method comprising:

implanting one or several autonomous specific monitoring modules (MSy), at a core of the user program of the controller (C), at one or several chosen locations, assigning one or several internal variables (V1 to Vn) to be monitored to each of the specific monitoring modules (Msy), the number of specific modules (MSy) and the number of variables to be monitored being not limited by the method, but only by memory capacities and available cycle time of the controller (C), implanting each of the specific monitoring modules (MSy) as close as possible to a writing of the variables (V1 to Vn) to be monitored, that is to say after the writing of the variables in the user program, and preferably immediately after the writing, the variables (V1 to Vn) to be monitored being chosen from the group consisting of inputs/outputs of sensors, components, machines, internal variables of the user program, variables of the industrial installation, communication variables, Boolean variables, numerical variables, complex variables of a character string type, during the automatic execution of the instructions in an instantaneous cycle turn (TCi), and when each of the specific monitoring modules (MSy) is automatically activated and executed by the user program, reading in real-time, via a reading unit (UL), a logic state of the variables (V1 to Vn) in the instantaneous cycle turn (TCi), comparing, via a control unit (UC), the logic state of the variables (V1 to Vn) of the instantaneous cycle turn (TCi) with a previously recorded logic state of the same variables (V1 to Vn) of the previous cycle turn (Tci−1), and only in case of a change of the logic state, reading the time data (Tj) corresponding to the instantaneous cycle turn (Tci), via a time-stamping unit (UH), and recording, via a recording unit (UE), a new read logic state of the variables (V1 to Vn) associated to the time data (Tj) of the instantaneous cycle turn (TCi), to form a metadata, in a global memory unit (UM_G) of the controller (C), and analyzing, with a dedicated assessment device, the metadata recorded in the global memory unit (UM_G) of the controller (C) to visualize, in real-time, the operation of the user program and/or of the industrial installation and identifying a possible malfunction in the user program and/or in the industrial installation.

2. The method according to claim 1, wherein the time data (Tj) read by time-stamping unit (UH) of the specific monitoring module (MSy) correspond to the real time of an internal clock of the controller (C), when the specific monitoring module is a module parameterized in "autonomous" mode or in "master" mode.

3. The method according to claim 2, wherein the time data (Tj) read by the specific monitoring module (MSy) correspond to the time read by another specific monitoring module, when the specific monitoring module is a module parameterized in "slave" mode and is associated to the other specific monitoring module parameterized in "master" mode.

4. The method according to claim 1, further comprising assigning to the at least one specific monitoring module (MSy) a number (n) of variables (V1 to Vn) to be monitored, and the reading unit (UL) of the specific monitoring module (MSy) reading the logic state of each of the variables (V1 to Vn) monitored in the instantaneous cycle turn (TCi) and recording in the global memory unit (UM_G) of the controller (C) the logic state of all variables (V1 to Vn) monitored in the instantaneous cycle turn (TCi), if the logic state of at least one of the monitored variables (V1 to Vn) has changed.

5. The method according to claim 1, further comprising implanting several autonomous specific monitoring modules (MS1 to MSt) at various locations chosen in the user program of the controller (C), and assigning to every specific monitoring module (MSy, where y is comprised between 1 and t) one or several variables (V1 to Vn) to be monitored.

6. The method according to claim 1, wherein, to analyze the metadata recorded in global memory unit (UM_G) of the controller (C) and identify a possible failure in the user program and/or in the industrial installation, recovering, in the dedicated assessment device, the metadata recorded in global memory unit (UM_G) of the controller (C).

7. The method according to claim 1, further comprising recovering the metadata in the dedicated assessment device, and performing a deferred static offline analysis of the metadata by dedicated assessment software.

8. The method according to claim 1, further comprising connecting the dedicated assessment device to the controller (C) to perform a dynamic online analysis of the metadata by dedicated assessment software.

9. The method according to claim 1, further comprising parameterizing with a parameterizing unit (UP) the operation of the specific monitoring module (MSy) by at least one parameter selected from the group consisting of a "run" mode for which the specific monitoring module is activated either manually by an external control or automatically by the user program, a "stop" mode for which the specific monitoring module is de-activated, an "initialization" mode for which the specific monitoring module resets to zero the metadata corresponding to variables (V1 to Vn) monitored and recorded in the global memory unit (UM_G) of the controller (C), an "autonomous" mode or a "master" mode in which the specific monitoring module reads the real time of the internal clock of the controller (C), a "slave" mode in which the specific monitoring module uses the time read by another specific monitoring module parameterized in "master" mode.

10. The method according to claim 1, further comprising inhibiting at least one of the variables (V1 to Vn) monitored by the specific monitoring module (MSy), and the logic state of the at least one inhibited variable will only be recorded when the logic state of at least one other non-inhibited variable will change.

11. The method according to claim 1, further comprising designing a generic module (MG) dedicated to monitoring in the user program of the controller (C) in a form of a unique program code comprising at least the reading (UL), the control (UC), the time-stamping (UH), the recording (UE) the and parameterizing (UP) units, and creating each specific monitoring module (MSy) in a form of an executable program module of the generic module (MG) dedicated to monitoring implanted in the user program.

12. The equipment according to claim 11, wherein each of the specific monitoring modules (MSy) comprises a number (n) of inputs to which a number (n) of variables (V1 to Vn) to be monitored is assigned, the reading unit (UL) is arranged to read the logic state of each of the variables (V1 to Vn) in the instantaneous cycle turn (TCi) and the recording unit (UE) is arranged to record the logic state of all variables (V1 to Vn) in the global memory unit (UM_G) of the controller (C), if the logic state of at least one of the monitored variables changes.

13. The equipment according to claim 11, wherein the equipment comprises several monitoring modules (MS1 to MSt) implanted at various locations chosen in the user program, and each specific monitoring module (MSy) comprises one or several inputs, and a variable (V1 to Vn) to be monitored being assigned to each input.

14. The equipment according to claim 11, wherein the dedicated assessment device comprises a memory unit in which the metadata recorded in global memory unit (UM_G) of the controller (C) are recovered, as well as dedicated assessment software arranged to process and represent, in a graphic form, the metadata in order to visualize the operation of the user program and/or of the industrial installation in real-time.

15. The equipment according to claim 11, wherein each of the specific monitoring modules (MSy) comprises a parameterizing unit (UP) arranged to parameterize its operation by at least one parameter chosen in the group of parameters consisting of a "run" function for which the specific monitoring module is activated either manually by an external control or automatically, depending on conditions, by the user program, a "stop" function for which the specific monitoring module is de-activated, an "initialization" function for which the specific monitoring module resets to zero in the global memory unit (UM_G) of the controller (C) the recorded metadata corresponding to monitored variables (V1 to Vn), an "autonomous" mode or a "master" mode in which the specific monitoring module reads the real time of the internal clock of the controller (C), and a "slave" mode in which the specific monitoring module uses the time (Tj) read by another specific monitoring module parameterized in "master" mode.

16. The equipment according to claim 11, wherein the equipment comprises a generic module (MG) dedicated to monitoring of a unique program code inside of the user program of the controller (C) and comprising at least the reading (UL), the control (UC), the time-stamping (UH), the parameterizing (UP) and the recording (UE) units, and each of the specific monitoring modules (MS1 to MSt) implanted in the user program is an executable program module of the generic module (MG) dedicated to monitoring.

17. A monitoring and assessment equipment of an industrial installation driven by a programmable controller (C) by instructions programmed in a user program of the controller, the user program comprising internal variables for coordinating the automatic execution of the instructions at every indefinitely repeated cycle turn (TC) of the controller (C), allowing operation of at least a section of the industrial installation,
wherein the implements the monitoring and assessment method according to claim 1 and comprises one or several autonomous specific monitoring modules (MSy) arranged to be implanted at one or several locations chosen in the core of the user program of the controller (C), each of the specific monitoring modules (MSy) comprising at least one input to which one internal variable (V1 to Vn) to be monitored is assigned, the reading unit (UL) arranged to read in real-time the logic state of the variable (V1 to Vn) when each of the specific monitoring modules (MSy) is automatically activated during the automatic execution of the instructions in an instantaneous cycle turn (TCi), the control unit (UC) arranged to compare the logic state of the variable (V1 to Vn) of the instantaneous cycle turn (TCi) with the previously recorded logic state of the same variable (V1 to Vn) of the previous cycle turn (TCi−1), the time-stamping unit (UH) arranged to read the time data (Tj) corresponding to the instantaneous cycle turn (TCi), and the recording unit (UE) arranged to record the new read logic state of the variable (V1 to Vn) associated to the time data (Tj) of the instantaneous cycle turn (TCi) to form a metadata in a global memory unit (UM_G) of the controller (C) only in case of a change of the logic state, and the equipment moreover comprises a dedicated assessment device arranged to analyze the metadata recorded in the global memory unit (UM_G) of the controller (C), visualize the operation of the user program and/or of the industrial installation in real-time and identify the possible malfunction in the user program and/or in the industrial installation.

18. The equipment according to claim 17, wherein each of the specific monitoring modules (MSy) is a module parameterized in "autonomous" mode or in "master" mode, and the time-stamping unit (UH) is arranged to read the real time (Tj) of the internal clock of the controller (C).

19. The equipment according to claim 18, wherein each of the specific monitoring modules (MSy) is a module parameterized in "slave" mode, and the time-stamping unit (UH) is arranged to read the time (Tj) provided by another specific monitoring module parameterized in "master" mode.

* * * * *

UNITED STATES PATENT AND TRADEMARK OFFICE
CERTIFICATE OF CORRECTION

PATENT NO. : 10,890,889 B2  
APPLICATION NO. : 15/742621  
DATED : January 12, 2021  
INVENTOR(S) : Frédéric Thabuis Page 1 of 1

It is certified that error appears in the above-identified patent and that said Letters Patent is hereby corrected as shown below:

In the Claims

Column 22, Line 35, replace "12. The equipment according to claim 11," with – 13. The equipment according to claim 12 –;

Column 22, Line 45, replace "13. The equipment according to claim 11," with – 14. The equipment according to claim 12 –;

Column 22, Line 51, replace "14. The equipment according to claim 11," with – 15. The equipment according to claim 12 –;

Column 22, Line 59, replace "15. The equipment according to claim 11," with – 16. The equipment according to claim 12 –;

Column 23, Line 10, replace "16. The equipment according to claim 11," with – 17. The equipment according to claim 12 –;

Column 23, Line 19, replace "17. A monitoring and assessment equipment" with – 12. A monitoring and assessment equipment –; and Column 24, Line 24, replace "18. The equipment according to claim 17," with – 18. The equipment according to claim 12 --.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*